(12) United States Patent
Bhagavatula

(10) Patent No.: US 6,259,830 B1
(45) Date of Patent: Jul. 10, 2001

(54) POLED ELECTRO-OPTIC DEVICE AND METHOD

(75) Inventor: Venkata A. Bhagavatula, Big Flats, NY (US)

(73) Assignee: Corning, Incorporated, Corning, NY (US)

( * ) Notice: Subject to any disclaimer, the term of this patent is extended or adjusted under 35 U.S.C. 154(b) by 0 days.

(21) Appl. No.: 09/451,624

(22) Filed: Nov. 30, 1999

(51) Int. Cl.$^7$ ........................................ G02F 1/035
(52) U.S. Cl. ........................ 385/2; 385/8; 385/11; 385/40
(58) Field of Search ................... 385/2, 8, 11, 40, 385/3, 10, 14, 16, 37, 129–131

(56) References Cited

U.S. PATENT DOCUMENTS

| | | |
|---|---|---|
| 4,277,271 | 7/1981 | Krohn .................................. 65/3 |
| 4,477,723 | 10/1984 | Carome et al. .................. 250/227 |
| 4,726,651 | 2/1988 | Wei et al. ...................... 350/96.29 |
| 4,925,269 * | 5/1990 | Scrivener ............................ 385/2 |
| 4,932,737 | 6/1990 | Yoon et al. .................... 350/96.14 |
| 5,007,696 | 4/1991 | Thackara et al. ............. 350/96.14 |
| 5,009,483 | 4/1991 | Rockwell, III ................. 350/96.24 |
| 5,239,407 | 8/1993 | Brueck et al. .................... 359/326 |
| 5,400,172 | 3/1995 | Khanarian et al. .............. 359/326 |
| 5,596,671 | 1/1997 | Rockwell, III ................... 385/147 |
| 5,617,449 | 4/1997 | Brueck et al. ................... 385/122 |
| 6,041,149 | 3/2000 | Monte ................................. 385/2 |
| 6,134,356 | 10/2000 | Monte ................................. 385/2 |

FOREIGN PATENT DOCUMENTS

| | | |
|---|---|---|
| 0867743A2 | 9/1998 | (EP) . |
| 0872756A1 | 10/1998 | (EP) . |
| WO90/08970 | 8/1990 | (WO) . |
| WO98/47041 | 10/1998 | (WO) . |

OTHER PUBLICATIONS

"What Integrated Optics is Really Used For" by M.A. Powell and A.O. Donnell, Optics & Photonics News, Sep. 1997, pp. 23–29.

"A Poled Electrooptic Fiber", by X.–C. Long, R.A. Myers and S.R.J. Brueck, IEEE Photonics Technology Letters, vol. 8, No. 2, Feb. 1996, pp. 227–229.

"Poled Fiber Devices–Mechanisms & Applications", by S. C. Fleming et al, OFC '96, San Jose, ThS3, p. 287, Feb. 25–Mar. 1, 1996.

\* cited by examiner

Primary Examiner—Phan T. H. Palmer
(74) Attorney, Agent, or Firm—Juliana Agon

(57) ABSTRACT

A resultant device and a method for making a frame structure for use as a poled optical device (10) includes providing a glass preform (30) having a poling area (12) and a waveguiding core area (16). At least one feedstock (24) is assembled into the waveguiding core area (16). The at least one feedstock (24) is separated from the poling area (12). The glass preform (30) and the at least one feedstock (24) are heated (36) and drawn into a smaller diameter (13) to form an optical waveguide.

6 Claims, 9 Drawing Sheets

POLED ELECTRO-OPTIC DEVICE AND METHOD

BACKGROUND OF THE INVENTION

1. Field of the Invention

The present invention relates generally to poled electro-optic devices, and particularly to glass poled electro-optic devices.

2. Technical Background

Poling glass fibers in general and fused silica optical fibers in particular, is known to make the fibers electro-optically "active" or into an electro-optically responsive medium.

One application of an electro-optically responsive medium, such as an organic non-linear optical polymer or an inorganic waveguide, is its use as a switch. The polarization properties of integrated optical switches, modulators, filters, and other applications, are important in determining their utility in the fiber communication system. These optical devices must perform efficient and complete switching of light, without regard to the light's state of polarization because linearly polarized light coupled into single-mode circular fibers suffers a rapid conversion to other polarization states. Light coupled from a fiber therefore usually possesses an unknown elliptical polarization, and both transverse horizontal electric (TE) and transverse vertical magnetic (TM) modes will be excited in the integrated optical circuit.

One known polarization-independent waveguide device is constructed with an inorganic waveguide channel such as with crystalline $LiNbO_3$ (Niobate). However, there are certain disadvantages in the use of Niobate or other inorganic crystal because of the limitation of the input optical power and operational wavelength due to the inherent photorefractive effect.

An organic polarization-insensitive linear waveguide electro-optic waveguide phase modulator has been developed to overcome the bandwidth limitations of conventional inorganic electro-optic materials. In this linear organic waveguide structure, the optical path has two sets of electrodes, which apply a horizontal electric field and a vertical electric field, respectively, to a nonlinear optically responsive polymeric medium in the optical path. The polymer medium section between each set of electrodes has a noncentro-symmetric molecular orientation parallel to the respective electric fields.

Another application of electro-optically responsive medium and desired result of the poled fiber is to be able to induce an electro-optic coefficient as large as possible or at least larger than those obtained in Lithium niobate crystals, the commonly used electro-optically responsive modulator for advanced optoelectronic systems in order to reduce packaging costs. For a high-speed fiber communication system, the output of a diode laser is often coupled into a single-mode optical fiber. The fiber, alternately referred to as an optical waveguide as the more general term, is then coupled to a Lithium niobate waveguide modulator whose output is again coupled into a fiber. Discrete optical components, such as graded-index lenses, micro-lenses or other beam-shapers are needed at each coupling node to adapt or match the different mode profiles and spatial extents of the diode laser and modulator waveguide modes to the fiber mode. Tight tolerances, in the range of micrometers, are required to minimize coupling losses. If a modulator could be simply produced that was integrated into the fiber that can simply be spliced onto the laser fiber, the manufacturing and packaging costs associated with these high-speed fiber communication systems would be reduced.

Recently, fiber has been induced with a significant improvement of the effective electro-optic coefficient by the use of an ultraviolet beam along with an applied electric field close to the core of the single mode fiber to produce the poling in contrast to the use of high temperatures under an applied electric field, and by the provision for two wire electrodes internal to the fiber to increase resistance to breakdown during poling and to provide a better overlap between the nonlinearity and the optical mode volume. Small lengths of fiber (about 10 cm) is drawn from a preform with two large holes close to the core for thin electrode wires that are to be inserted or threaded following the fiber drawing. This wire insertion is a difficult manufacturing step. To avoid breakdown, one short wire is inserted from each end of the fiber.

Because the holes in the fiber need to be significantly larger than the electrode diameter for the "threading" process, this dimensional control is difficult, resulting in significant variation in the distance between the electrodes and core and between the electrodes. Hence, a longitudinal non-uniformity of the applied poling field and of the electro-optic coefficient can result.

One low-cost alternative fabrication technique for an electro-optically active fiber segment deposits a dielectric isolation structure surrounding an etched "D" shaped fiber that is glued to a flat substrate with a conductive surface for forming a first electrode to allow high field poling while allowing the ends of the fiber to extend beyond the substrate for later splicing with additional fiber sections. The fiber/dielectric structure is polished to provide a planar surface on the side opposite the substrate. A second metal layer is deposited on the planar surface over the fiber to form a second electrode. Such a sample was poled and placed in the measurement arm of a Mach-Zehnder interferometer. As expected, the resultant phase shift signal was found to be sensitive to the polarization of input laser light. Consistent with the symmetry arrangement of the Mach-Zehnder interferometer arms, the ratio of the signal from TE mode to one from TM mode was about 2.4:1 which implies that the electro-optic coefficient ratios dropped along the traveled lengths of the Mach-Zehnder arms due to the mode changes.

Hence, there is a need for an improved electro-optically active fiber that can be simply spliced with other fiber components to significantly reduce the manufacturing costs.

SUMMARY OF THE INVENTION

One aspect of the present invention is the teaching of a method for making a frame structure for use as a poled optical device, comprising the steps of providing a glass preform having a poling area and a waveguiding core area; assembling at least one feedstock into the waveguiding core area; separating the at least one feedstock from the poling area; heating the glass preform and the at least one feedstock; and drawing the preform into a smaller diameter to form an optical waveguide.

In another aspect, the present invention includes forming a plurality of electrode apertures in the poling area of the preform about an inner aperture of the waveguiding core area and disposing an electrode-retaining material into the plurality of electrode apertures.

Additional features and advantages of the invention will be set forth in the detailed description which follows, and in part will be readily apparent to those skilled in the art from

DETAILED DESCRIPTION OF THE PREFERRED EMBODIMENTS

Figure 1:
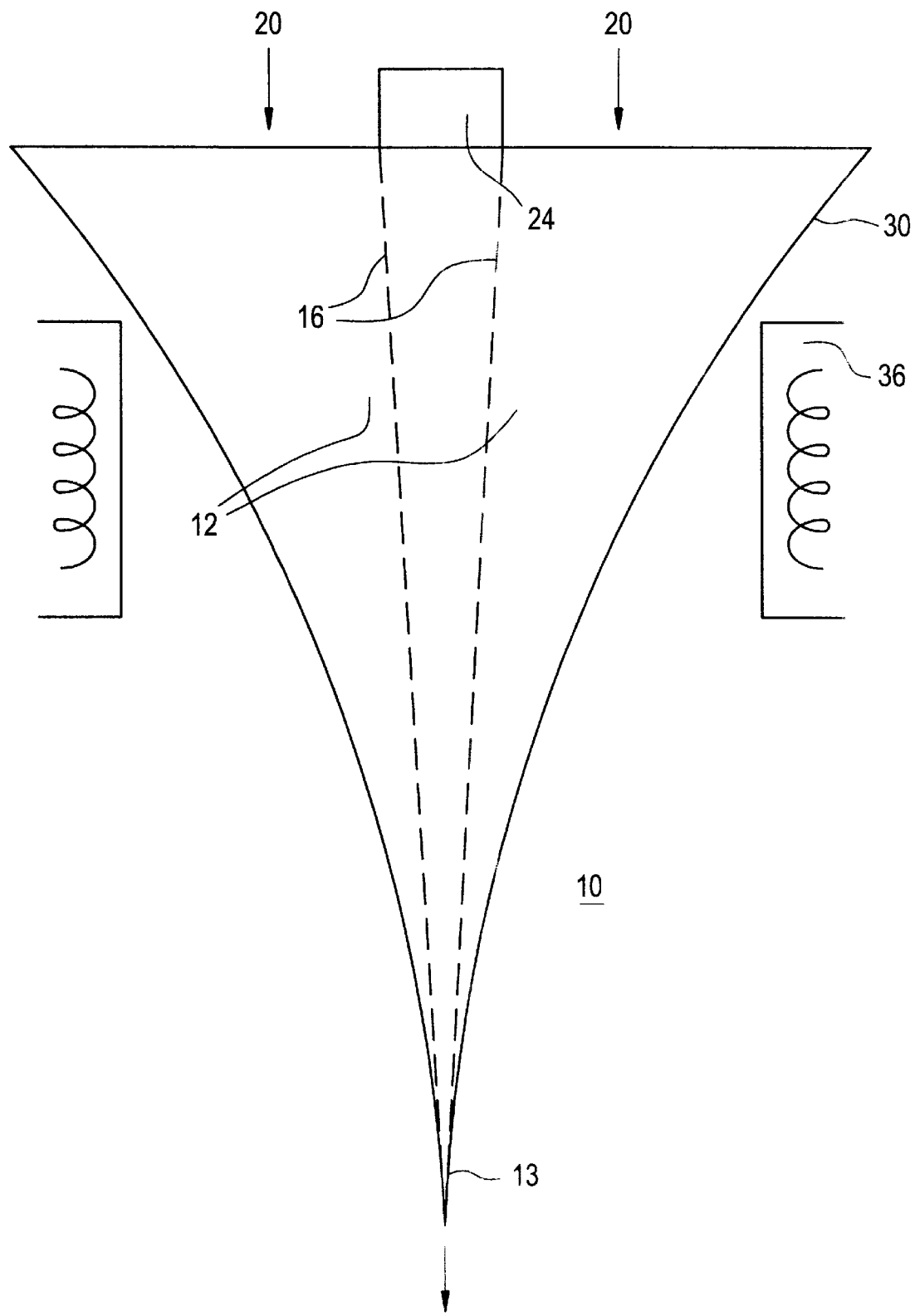
FIG. 1 is a side-view of a general poled optical device 10 and its fabrication representation, in accordance with the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the poled optical device of the present invention is shown in FIG. 1, and is designated generally throughout by reference numeral 10.

In accordance with the invention, the present invention for a method for making a frame structure for use as a poled optical device 10 includes providing a glass preform 30 having a poling area 12, incorporating electrodes 20, and a waveguiding core area 16. At least one waveguiding core or feedstock 24 is assembled into the waveguiding core area 16. The at least one feedstock 24 is separated from the poling area 12. The glass preform 30 and the at least one feedstock 24 are heated by a furnace 36 and drawn into a smaller diameter electrode-incorporated fiber 13 to form an optical waveguide. It is to be appreciated that this waveguiding core or feedstock 24 can be a separate or integral part of the glass preform 30.

Figure 5:
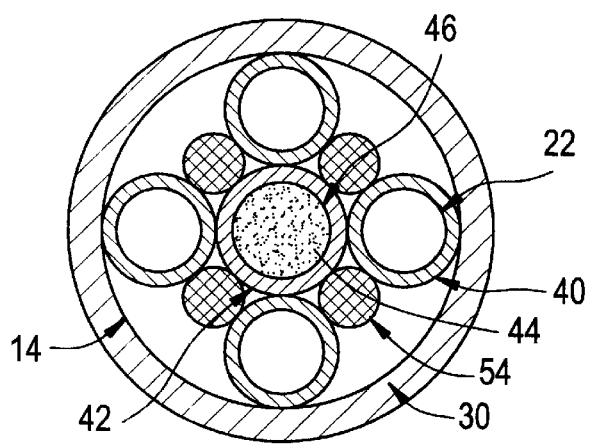
FIG. 5 is a top cross-sectional view of the preform configuration 34 of the poled optical device 10 of FIG. 1 having four electrodes, separated by optional filler rods, in accordance with the present invention.
Figure 6:
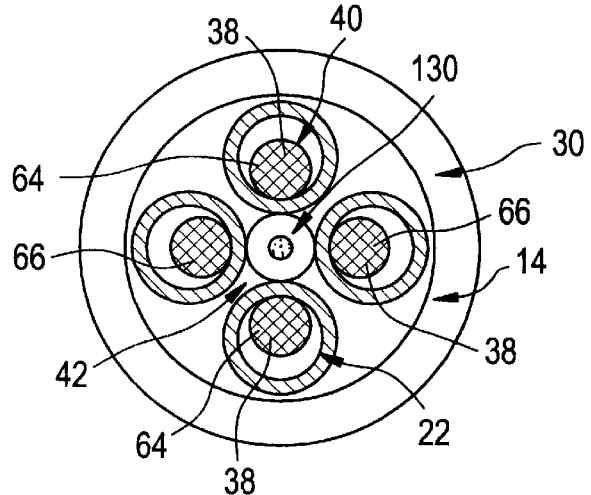
FIG. 6 is a top cross-sectional view of the preform configuration 34 of the poled optical device 10 of FIG. 1 having four electrodes inserted within their respective tubes, in accordance with the present invention.
Figure 13:
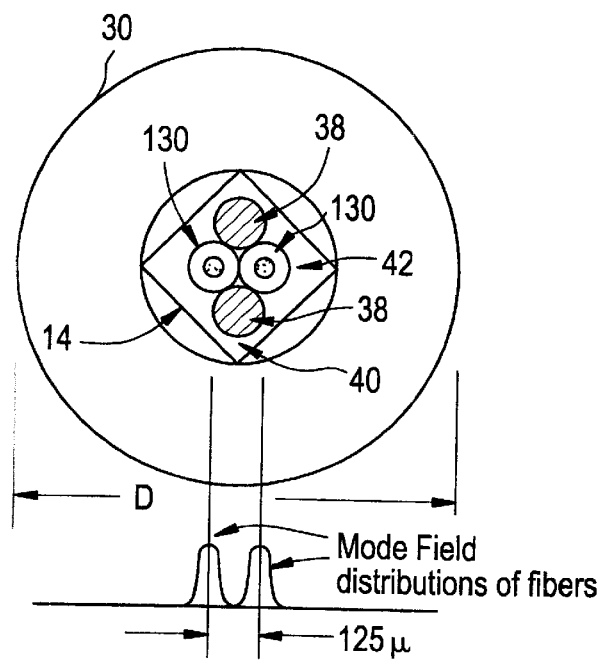
FIG. 13 is a top cross-sectional view of the preform configuration 34 of the poled optical device 10 of FIG. 1 having two electrodes, surrounding two optical fibers, within the same central opening, in accordance with the present invention.

As embodied herein, and depicted generally in FIG. 1, the waveguiding core area 16 and the poling area 12 can be defined by one central opening 14 in FIGS. 5–7 and 13. This central opening 14 is partitioned into a first space portion 40 for a plurality of electrode apertures 20, as the poling area 12 of FIG. 1, and a second space portion for an inner aperture 42 to accommodate the waveguiding core area 16 of FIG. 1. Thin-walled tubes 22 in FIG. 5 and FIG. 6, preferably made of glass or another suitable material, mark the space within the central opening 14 for forming the electrode apertures while optional filler rods 54 of FIG. 5, separating the thin-walled tubes 22, mark the second space portion for inserting a core rod 44 (with or without an optional cladding 46) within the thus formed inner aperture 42 as the waveguiding core area. In accordance with the teachings of the present invention, control of the cross-sectional shape 34 of the resultant fiber 13 of FIG. 1 and separation between poling and waveguiding core areas is facilitated by placing these optional filler rods 54 of the desired placement and shapes into the preform 30 as seen in FIG. 5. Variations and modifications of other possible separation schemes are contemplated by the present invention. As can be seen in FIG. 13, the central opening 14 need not be circular but can be a square, rectangle or be of other shapes.

Figure 11:
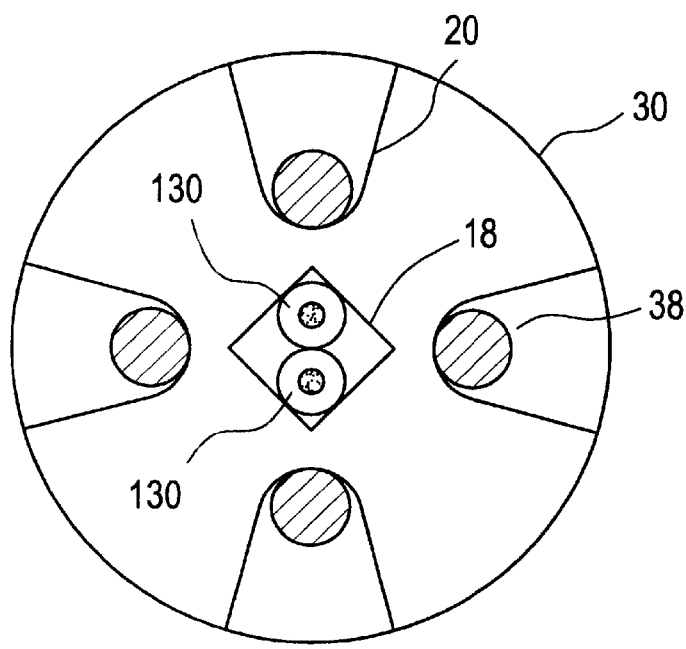
FIG. 11 is a top cross-sectional view of the preform configuration 34 of the poled optical device 10 of FIG. 1 having four V-shaped electrode apertures, filed with electrodes surrounding two optical fibers, in accordance with the present invention.
Figure 12:
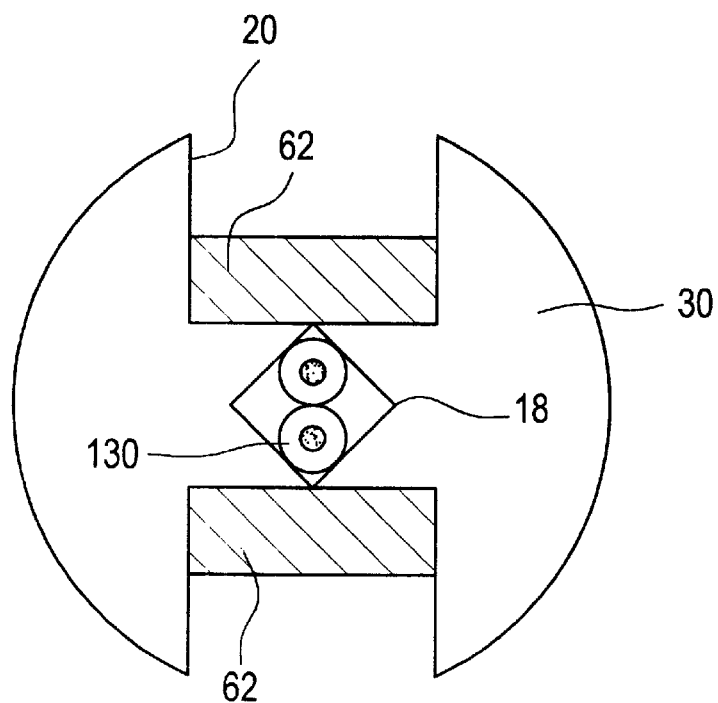
FIG. 12 is a top cross-sectional view of the preform configuration 34 of the poled optical device 10 of FIG. 1 having two U-shaped electrode apertures, filed with rectangular electrodes surrounding two optical fibers, in accordance with the present invention.

In an alternate embodiment of the invention, as embodied herein and as shown in FIGS. 2–3 and 8–12, the waveguiding core area 16 of FIG. 1 is defined by an inner, central, or feedstock aperture, opening, or hole, generally termed a feedstock opening 18. Instead of having one central opening 14, as previously shown in FIGS. 5–7 and 13, the glass preform 30 can have a separating frame, defined by its cross-sectional configuration 34 of FIG. 1, such that a plurality of electrode apertures 20 form the poling area 12 of FIG. 1 that are disposed about the feedstock opening 18 which forms the waveguiding core area 16 of FIG. 1. Again, as can be seen in FIGS. 11 and 12, the feedstock opening 18 need not be circular, as in FIG. 8–10, but can be a square, rectangle or be of other shapes.

Figure 2:
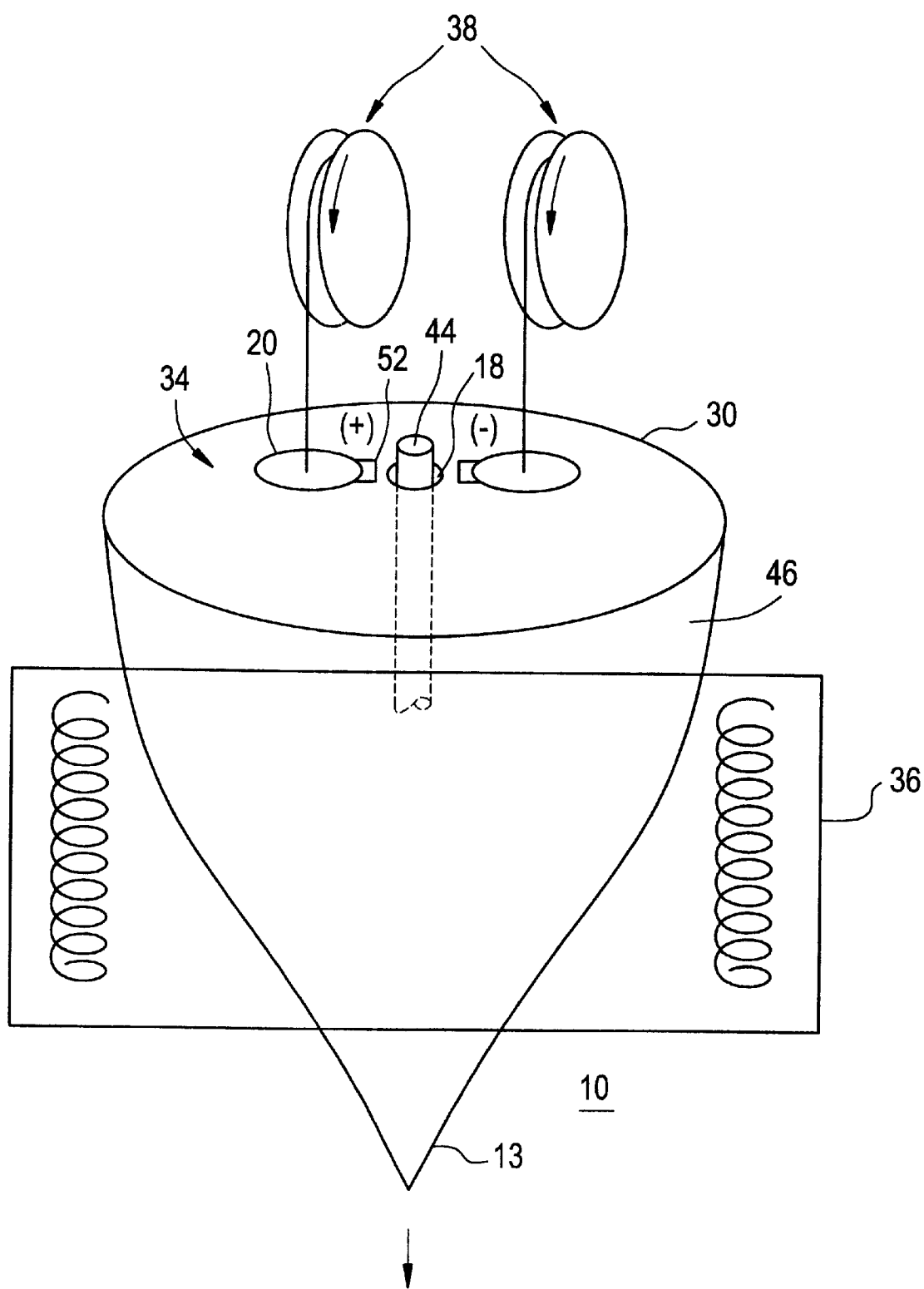
FIG. 2 is a representation of the fabrication of FIG. 1 used in forming the poled optical device 10 having an air gapped two electrode cross-sectional preform configuration 34, in accordance with the present invention.
Figure 3:
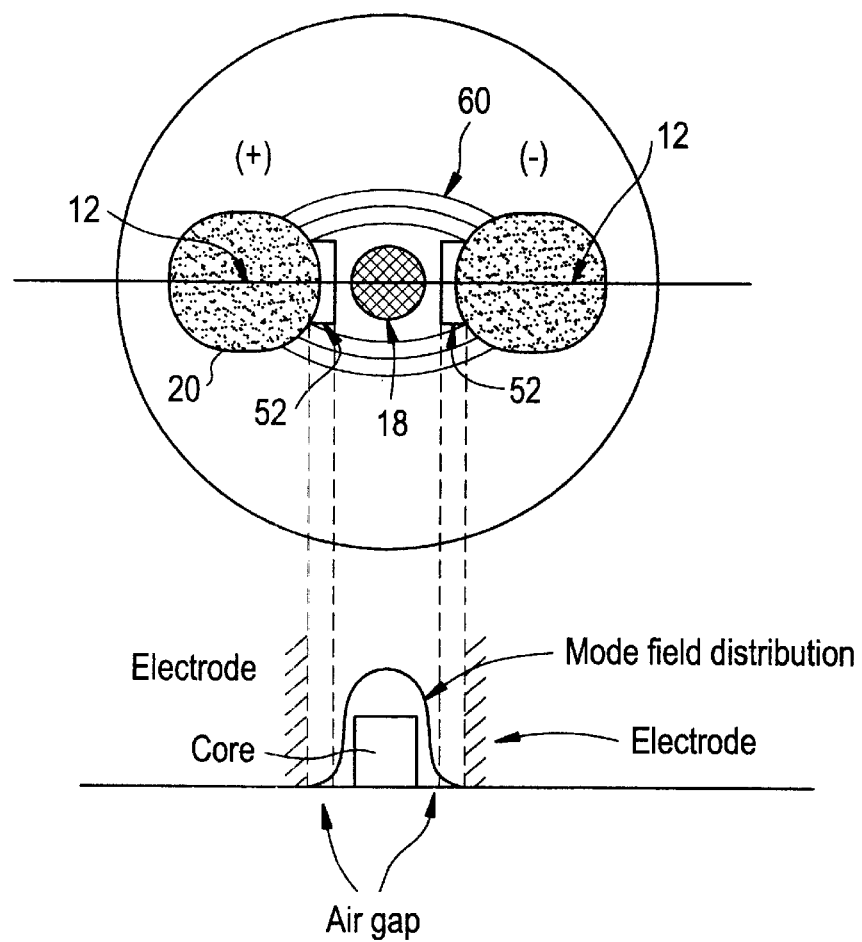
FIG. 3 is a top cross-sectional view of the preform configuration 34 of FIG. 2, in accordance with the present invention.
Figure 4:
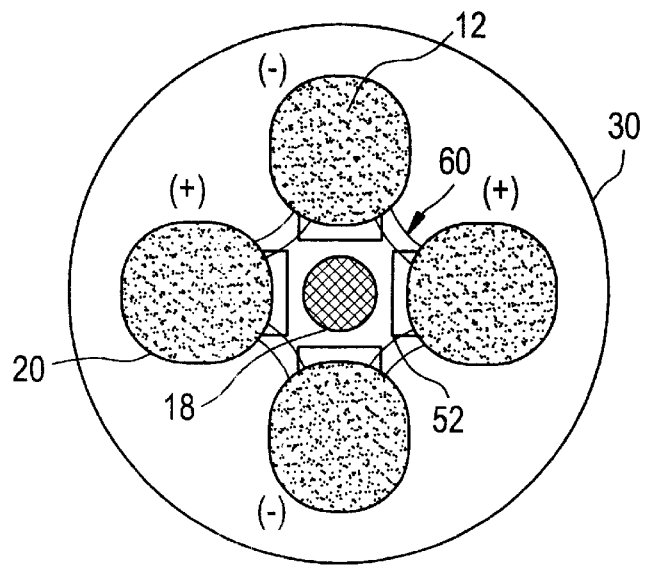
FIG. 4 is a top cross-sectional view of the preform configuration 34 of the poled optical device 10 of FIG. 1 having four electrodes, in accordance with the present invention.

Similarly, the electrode apertures 20 can be circular, bulb-shaped, as in FIGS. 2–4, to accommodate an aperture extension 52 for an air gap, rectilinear U-shaped as in FIG. 12 or curvilinearly V-shaped as in FIGS. 8–11, as cut-out or grinded from the preform 30 to form any other shapes as long as the resultant waveguiding core area is electrically separated from the poling area before the actual poling takes place. Instead of forming the electrode apertures 20 by first marking the desired alignment with the thin-walled tubes 22 in FIGS. 5–6, the preform 30 can simply be drilled, as in FIGS. 2–4, or otherwise shaped with the electrode apertures 20 in whatever shape desired, with or without the preferred air gaps formed by an aperture extension 52.

Whether the waveguiding core area 16 and the poling area 12 of FIG. 1 are accommodated by one or various openings, the central or inner aperture for the at least one feedstock can be optionally made rectangular, as in FIGS. 11–13 to accommodate two fiber feedstocks 130. The cross-sectional configuration of the preform 30 having the rectangular or square central opening 14 of FIG. 13 or feedstock opening 18 of FIGS. 11–12 can be made by starting with a cladding tube or preform 30 having a rectangular channel, groove, or other shaped aperture, inside the tube for depositing a plurality of core cullets, optical fiber feedstock or other types of feedstock within.

To maintain the electrical separation between the poling and waveguiding core areas, the at least one feedstock 24 of FIG. 1 is preferably an optical fiber 130 if that is placed proximate to wires 38 within the same central opening 14, as seen in FIG. 13. In order to prevent shorting of the wires within the same central opening 14 and if the feedstocks are not electrically separating the wires, as in FIG. 13, the wires 38 are preferably coated with glass 28 as in FIG. 7 or fed (before or after the draw) into thin-walled tubes 22 of FIGS. 5–6, for electrode positioning and electrode-retaining.

However, if the preform 30 is providing the separation by having separate apertures, the feedstock 24 of FIG. 1 can be a core rod 44 uncladded or cladded with an outer cladding 46 (as seen in FIG. 5), a fiber 130 (as in FIGS. 11–12), or other waveguiding core embodiments. As long as there are separating electrode apertures 20 formed by the preform 30 (as in FIGS. 2–4, 8, and 11) or provided by the thin-walled tubes 22 (as in FIGS. 5–6), or other cross-sectional configuration ensuring non-shorting of the wires 38, as in FIG. 13, the poling area 12 of FIG. 1 is provided by feeding electrode wires 38 as in FIG. 2, placing a bundle of wires 38, as in FIG. 9 (optionally wrapped within the preform 30 by a dielectric wrap 26) or otherwise forming suitable shapes for electrode placement into the electrode apertures, as in the rectangular shape of FIG. 12 or oval shapes the electrodes 62 of FIG. 10, or disposing other metallic material in other forms in the various shaped electrode apertures 20.

Figure 8:
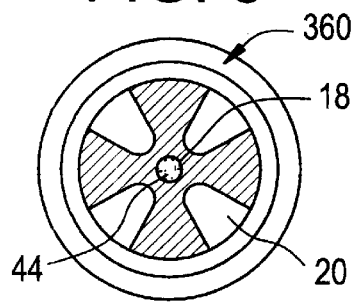
FIG. 8 is a top cross-sectional view of the preform configuration 34 of the poled optical device 10 of FIG. 1 having four V-shaped electrode apertures, in accordance with the present invention.
Figure 9:
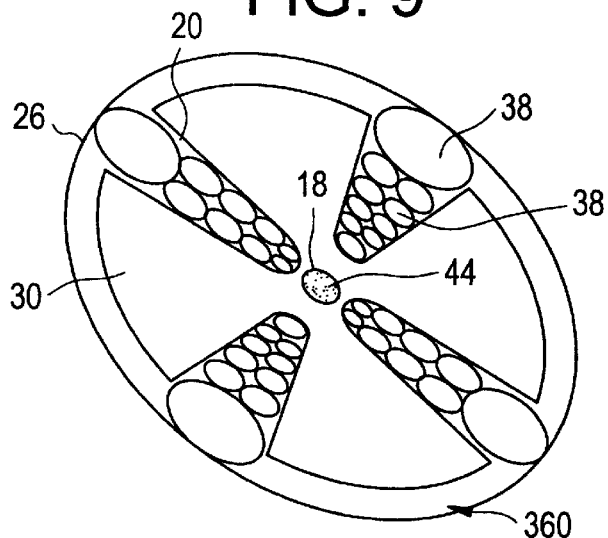
FIG. 9 is a top cross-sectional view of the preform configuration 34 of the poled optical device 10 of FIG. 1 having four V-shaped electrode apertures, filed with a bundle of wires, in accordance with the present invention.
Figure 10:
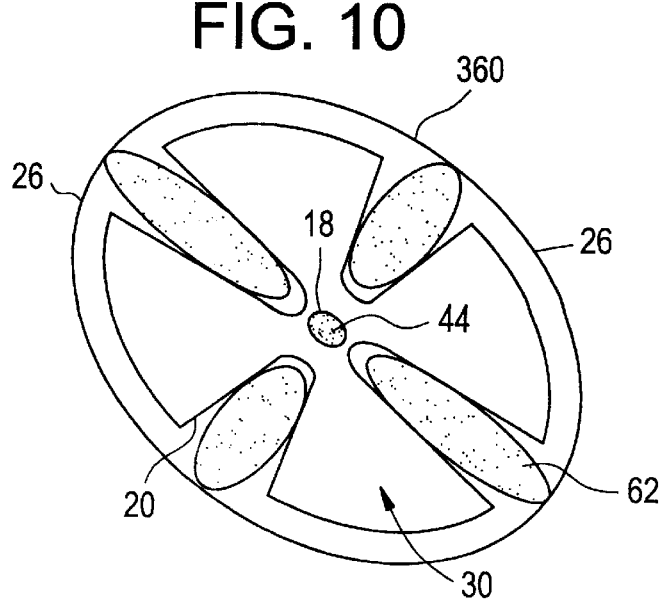
FIG. 10 is a top cross-sectional view of the preform configuration 34 of the poled optical device 10 of FIG. 1 having four V-shaped electrode apertures, filed with oval shaped electrodes, in accordance with the present invention.

Optionally, as seen in FIG. 8, for extra stability or for a desired cross-sectional configuration feature, an overclad or holding tube, cane, sleeve, or jacket 360 made of the same cladding material as the first cladding tube 46 of FIG. 5 or some other composition such that the overclad has a refractive index the same as the first cladding tube or lower is used to secure electrodes into the open slots or apertures 20 grinded out from the preform 30. An exemplary composition of the overclad tube 360 is boron doped silica.

In general and referring to FIGS. 2–4, to provide the desired separating frame, the preform 30 may be formed from a blank, quartz tube or tube of another glass material which can be cut to a desired length and cut, rejoined, machined, or otherwise processed to have any desired cross-sectional configuration 34, including at least one aperture or central opening to form a hollow tube or an approximation of multiple hollow tubes. As one example, the preform 30 can be polished, etched, grinded, cut, or otherwise processed on opposed peripheral sides of the preform 30, preferably made of cladding material, to form slots, channels, or other electrode apertures 20, close to the central or feedstock opening 18 for the core 44 as the feedstock, for later electrode placement within the electrode aperture 20. As is known, there is an important tradeoff between the proximity of the electrode, formed by wire 38 incorporation, to the core 44, allowing a larger electro-optic coefficient with a close spacing and at the same time, increasing the linear propagation optical loss of the poled optical device 10. The optimal distance from the thus formed electrode, (whether by wires 38 or other metallic deposition methods) to the core 44 must be established as part of a detailed engineering design. Once the optimal distance has been established for a specific design, the preform blank 30 is optionally shaped with a rectangular aperture extension or other shaped elongation 52 of the electrode aperture 20 to form a controlled air gap. The circular portion of the electrode aperture 20 allows positioning of the electrode material 38 while the extension 52 of the electrode aperture 20 provides the controlled air gap. Together, the extension 52 and the circular electrode portions of the aperture 20 form a bulb-shaped aperture, in this exemplary embodiment of FIG. 2. The walls of the preform blank 30 at the aperture extension 52 will be left empty after the electrode 38 placement to reduce propagation losses even with the maximally close spacing of the electrodes (formed by wires 38. or other metallic material) to the core 44. The resultant air gap from the aperture extension 52 drastically reduces the amount of light intensity in the electrode or poling area and hence reduces the attenuation caused by the presence of the electrodes 38. It will be apparent to those of ordinary skill in the pertinent art that modifications and variations can be made to the electrode apertures 20 of the present invention depending on desired preform cross-sectional shapes desired. For example, the electrode apertures 20 of other embodiments, bearing other shapes, may still be extended by a similar extension to form an appropriate air gap.

Other embodiments of the electrode apertures are taught by the present invention. Instead of closed holes, the electrode apertures 20 are curvilinear "V" slots in FIGS. 8–11, rectangular cut-outs in FIG. 12, channels or recesses in the preform 30 of other suitable shapes such that a correspondingly shaped electrode 62 in FIG. 10 or multiple wires 38, initially bounded within the slotted preform 30 by a temporary or permanent dielectric (or elastomeric) wrap 26 or unbounded, can be placed inside the slots or apertures 20, close to the core centrally located within the feedstock opening 18. The apertures 20 in the form of slots can be made by grinding, etching, or other processing method. Tightly wrapping around the periphery of the slotted preform blank 30, the wrap 26 serves as a holding tube to hold the electrodes 62 of FIG. 10 or bundle of various shaped or dimensioned wires 38 of FIG. 9, secured in the open slots or apertures 20.

Referring to FIG. 12, one advantage of a rectangular shaped metallic deposition, bundled of wires, or other electrode formation 62, disposed in the rectangular cut-out, in the form of a rectilinear U-shaped aperture 20, is that this configuration allows the rectangular cut-out aperture 20 to act as a waveguide boundary to reduce propagation losses for certain modes.

Referring again to FIG. 2, once the electrode-retaining and feedstock materials are assembled, they can be integrated to form a frame for disposing the electrode material within before drawing. Alternatively, threading or other types of electrode placement of the metallic material before drawing but after the electrode aperture has been formed can be implemented. A modification of Coming Inc.'s multi-clad™ TM coupler technology and fused coupler techniques is used to form the poled electro-optic device by drawing the thus formed assembly. Preferably, the fiber is made by the technique utilizing a soft multi-component core glass 44, surrounded by a silica cladding 46. The large cladding tube, blank, cane or preform 30 filled with molten core cullets, filaments, rods or other shaped core material 44 is drawn as one embodiment of the feedstock 24 of FIG. 1. The core material 44 is placed within the cladding tube or preform 30 which has a lower refractive index than the core's refractive index.

Figure 14:
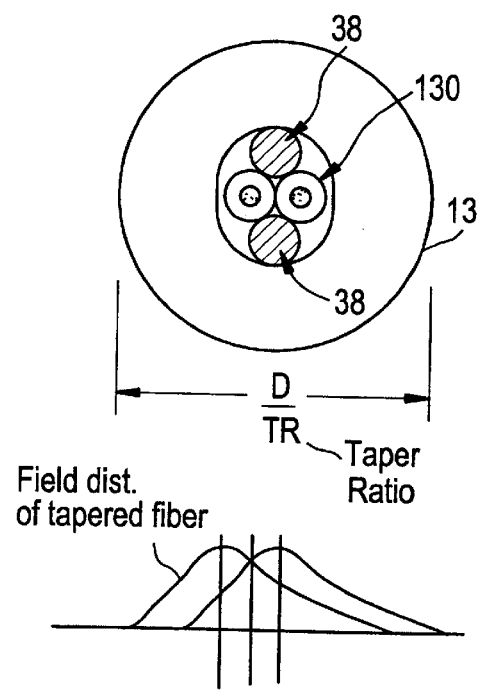
FIG. 14 is a top cross-sectional view of a tapered section of the poled optical device 10 of FIG. 13, in accordance with the present invention.
Figure 15:
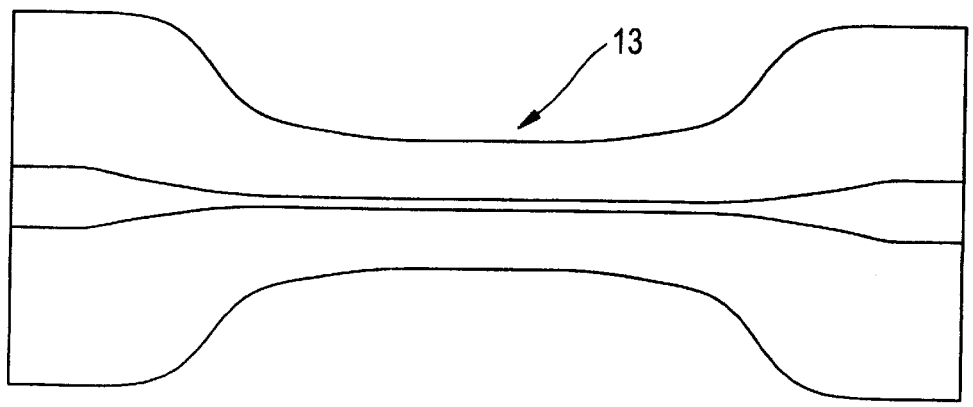
FIG. 15 is a side representation of the poled optical device 10 of FIG. 13 having the cross-sectional view of the preform configuration 34 taken through line A–A' and the cross-sectional view of the tapered section of FIG. 14 taken through line B–B', in accordance with the present invention.

Due to the large size of the starting tube, preform, or blank 30 used, threading, feeding or otherwise disposing long wires 38 from spools to form electrodes into the fiber 13 will not be as difficult as the conventional process. The preform 30 can have any desired design, shape, material, or cladding thickness to form as a starting frame, such as having a suitable central, inner, or feedstock opening (square, rectangular, elliptical or of other shapes) for at least one core 44 or one, two or more optical fibers 130 of FIGS. 6–7 and 11–13, as the feedstock. To provide built-in pigtails and easy electrical connections, the core 44 or fiber, as the feedstock, and the wire lengths 38 can optionally be made much larger than the tube, cane, or preform 30 through which they are inserted. This entire assembly is then secured with glue or tacked, and inserted in a tapering machine for splicing such that at least one section of the assembly is tapered down, as seen in FIG. 14 whose smaller dimensioned side-view B is referenced in FIG. 15. This tapering causes the glass parts (fiber core 44 or optical fiber 130 and preform 30) to collapse onto the wires 38 and stretched or drawn to a resultant smaller fiber size 13 of FIG. 2 or FIG. 14, while the metal wires 38 retain their wire diameter size.

Electrodes 20 of FIG. I are thus preferably incorporated in the fibers 13 by drawing wire electrodes 38 of high-temperature-melting metals (e.g. 0.001–0.003" tungsten wire) along with the feedstock. Because the wires 38 are chosen to have sufficiently high melting temperatures, such as tungsten, and platinum, the wires 38 will maintain their dimensions while the glass blank or preform 30 is tapered or necked-down to the final electrode incorporated fiber 13 dimensions. In the drawing process, the electrode holes or apertures 20 provided by the plurality of thin-walled tubes 22 of FIGS. 5–6 or just shaped into the preform 30, collapse onto the wire 38.

Hence, a preferred method of forming the poled electro-optic device 10, uses this redraw, "blown fiber" or collapsing process where electrodes to be positioned within the electrode apertures 20 are now inventively drawn along with the feedstock by incorporating into the preform, tube, or cane 30, having an appropriate cross-section 34, a metal which melts at a temperature below that at which the optical glass fiber softens, e.g., AL in code 7059 glass. Along with a suitable high melting point, this metal preferably should have the desired diameter and shape of the resultant electrode. Optionally, inert atmosphere or an inert glass flow provided in the tube 30 with the metal wires 38 will be needed to prevent oxidation of the wires 38. In this manner, the preform or blank 30, along with the wires 38 are heated to the required temperature in the draw furnace 36 and the blank 30 is drawn to a fiber 13 along with the wires 38. Thus, the glass preform or blank 30 having a relatively large width, as represented by the wider cross-section 34, is drawn into a thinner and longer shaped fiber 13. In this way, the end fiber 13 retains the basic cross-sectional shape 34 of the starting preform 30. The basic forming process is therefore similar in some respects to that employed to make conventional optical fibers. However, in the present invention, rather than producing conventional round fibers with an inner core, the fibers are shaped according to the cross-sectional configuration 34 desired.

Because the core 44, as the feedstock, is much softer than the cladding 46 of the preform 30, the core 44 will become a liquid during the drawing or collapsing process in between optionally sealed or unsealed ends of the fiber 13. Since the core 44 is molten and the cladding is softening, drawing and collapsing processes are relatively fast, so graded index profiles can be created in situ. With appropriate choices of cladding material, the drawn fibers 13 produced can be fusion spliced to conventional fibers making the poled optical device 10 quite practical in existing fiber networks and easing device manufacturing.

The core glass 44 or other feedstock is selected to melt at or below the softening point of the cladding tube 46 and selected, such that the thermal expansion difference between the core 44 and clad 46 not be so large as to shatter the resultant fiber 13 upon cooling. Hence, a difference in the softening point of the core and the softening point of the cladding is preferably at least 100 degrees Celsius. Furthermore, it is preferred that the core 44 exhibit a viscosity of less than $10^4$ poise at a temperature at which the cladding exhibits a viscosity of $10^{7.6}$ poise.

The fluid core 44 will begin to dissolve the silica clad 46 as the desired cross-sectional shape 34 is collapsed into a fiber 13, incorporating the electrode within. Because the core glass 44 is selected to be of a different material such that it is much softer than the cladding 46, the core glass 44 will be very fluid and conform to the geometry dictated by or conform to the cladding 46, provided by a desired cross-sectional shape or configuration of the core portion of the preform's cross-sectional configuration 34, when heated to the temperatures required to draw fiber 13. Preferably, the cladding 46 is pure silica but the cladding 46, the preform 30 and core 44 materials can be silica or of materials such as Pyrex glass, 7059 glass or other types of impure silica glass The shape or the quantity of the core 44 does not matter, it is more the inventive concept that the preform cross-sectional shape 34 can be made to accommodate at least a pair of electrodes, filler rods 54 of FIGS. 5 and 6 to form a desired electrode aperture or electrode alignment in alternate embodiments.

An advantage of the use of co-drawn wire electrodes is that the glass of the core 44 or preform 30 shrink-fits around the wire 38, so that even though the wire 38 is held, the glass does not bond to the wire 38. This non-bonding eliminates the need to have the glass expansion matched to the wire electrode. An additional advantage of co-drawing wire is that secondary operations to apply or insert electrodes into the fibers, often breaking the fibers or the wires in the process, are now not required. However, these secondary operations to insert electrodes in electrode-retaining areas can still be optionally used as in FIGS. 5, 8–12 without breakage due to an easier accessiblity of the electrode-retaining areas.

Within the electrode apertures, wires can optionally be deposited as thin or thick film electrodes because deposition advantageously provide a much higher electrical conduction. Alternatively, instead of using deposited thick or thin film electrodes, mercury metal can be applied using capillary action or under vaccuum, with the ends of the electrode aperture sealed off with a short length of wires for poling.

An alternative approach to using mercury is to fill the electrode apertures, in the form of slots, channels, or other recesses, with a metallic resin that can be reduced to a conductive carbon, such as graphite, under a reducing atmosphere. Because of the high voltage and very low current used with a graphite electrode, the resultant voltage drop being a high resistance value would not increase the propagation loss.

Instead of using resins, gold or other metallic inks can be filled in the electrode apertures, in the form of holes or open slots and their ink organics burned off to leave a resultant metallic electrode.

Although fibers are the preferred medium for the waveguiding core, it is of course possible to utilize other forms of waveguides, for example, planar waveguides.

Functionally, comparing the field distributions of FIG. 14 to FIG. 13, the process of tapering expands the mode fields propagating in the electrode incorporated fiber 13 and brings the wires 38 closer together over the tapered core or fiber 130 as the feedstock. Such an expanded field distribution, along with the closer spacing of the wires 38, leads to a better overlap of the electrical and optical fields.

Figure 16A:
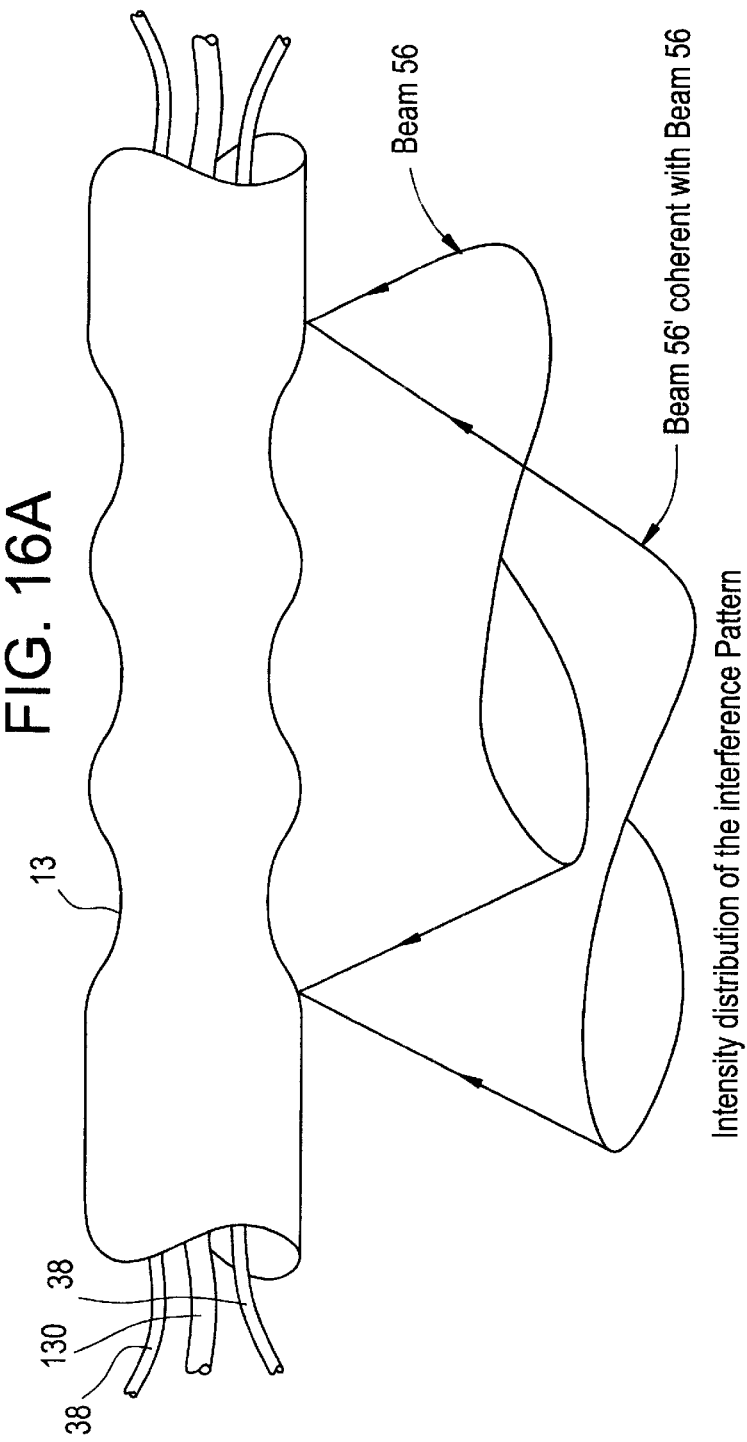
FIG. 16 (a–b) are side representation of a poled optical device 10 of FIG. 1 having multiple tapered sections, in accordance with the present invention.
Figure 16B:
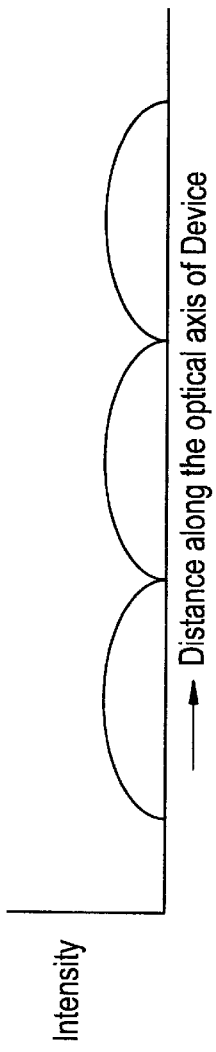

Referring to FIG. 16, the tapering can be made periodic to produce a poled device with a grating pattern. Preferably, the stretching and poling is done by a high power laser, such as a carbon dioxide CO2 laser or an excimer laser. Use of the CO2 laser, as a heat source, allows the coherent properties of the laser to generate an interference pattern due to the laser beams 56. The spacing of the interference pattern can be adjusted with the angle of the laser beams 56, causing the interference pattern which in turn allows precise spacing and intensity control of the pattern. This interference pattern can be used to heat the assembly of fiber 130 and wire electrodes 38 in a periodic tapering pattern and for periodic poling purposes to provide secondorder non-linearity or other electro-optic effects. CO2 lasers are used to heat and soften the preform such that the preform can be tapered. If an ultra violet light is used instead, a separate heat source may be needed and an ultra violet laser provides only the interference pattern and enhancement of the electro-optic effect. An inert gas or vacuum to purge the tube or preform 30 in the heated regions before tapering may be beneficial to prevent oxidation of the close wires 38.

Using such a high powered heat source, poled grating patterns with a periodicity of a few microns to hundreds of microns can be created. With such grating patterns created in a single electrode incorporated fiber having at least two electrodes, a switchable wavelength selective filter can be fabricated. With the ability to fabricate assemblies or structures with more than one core or fiber, as the feedstock, and more than two electrodes, polarization insensitive devices and devices with more than one output can be made.

In contrast to using only one pair of opposed electrodes to apply a substantially uniform electric (E) field around a core for coupling the electro-optic phenomenon with only one linear polarization effectively, the horizontal electric (E) field, as in conventional poled fibers and the air-gapped two electrode embodiment FIG. 3 of the present invention, the present invention additionally teaches the fabrication of a polarization-insensitive poled electro-optic device by having more than two electrodes, as in FIGS. 4–11. For example, the multiple thin-walled tubes 22 of FIG. 6 around the at least one waveguiding core or the fiber 130 as the feedstock allows a first set of spaced electrodes 64 to be positioned within the tubes 22, in proximity along the at least one waveguiding core, in the form of an optical fiber 130, to facilitate the application of a horizontal electric field to the waveguiding core, wherein the waveguiding core between the first set of spaced electrodes 64 has an electric field wave orientation which is parallel to the direction of the applied horizontal electric field. Additionally, at least a second opposed pair of thin-walled tubes 22 allow a second set of spaced electrodes 66 to be positioned in proximity along the same at least one waveguiding core to facilitate the application of a vertical electric field to the waveguiding core, wherein the waveguiding core between the second set of spaced electrodes 66 has an electric field wave orientation which is parallel to the direction of the applied vertical electric field.

Operationally, an intense D.C. electric field is applied across the fiber core for a prolonged period of time by the electrodes integrated in the cladding region of the fiber.

Figure 7:
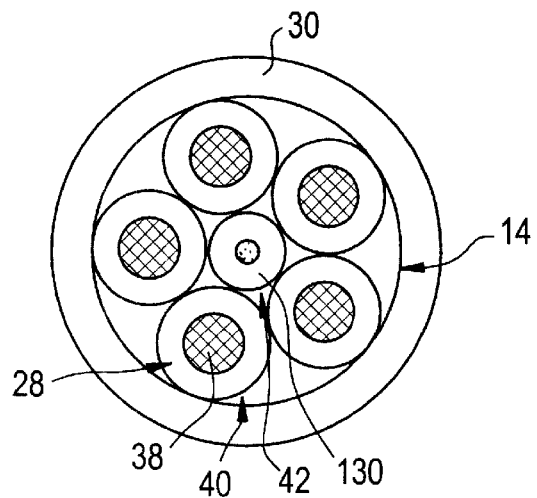
FIG. 7 is a top cross-sectional view of the preform configuration 34 of the poled optical device 10 of FIG. 1 having five glass-coated wire electrodes, in accordance with the present invention.

When elevated temperatures and/or an intense ultraviolet field is applied at the same time, as in the interference pattern of FIG. 16, such that very large poling E-fields are applied to the electrodes close to the core, the mode field lines 60 of FIG. 4 in the cladding of the preform 30 become partially oriented in a direction parallel to the applied field direction. Hence, with more than two electrodes or more than one pair of opposed electrodes, more E-field distribution possibilities can be created. For example, in FIG. 4, a four electrode preform cross-sectional configuration is shown and a five-electrode poled optical device is shown in FIG. 7. Having the second pair of opposed electrodes, or at least three electrodes, allow more efficient electro-optic coupling to the lowest order of the optical fundamental mode or to higher order modes. By allowing multiple-mode flexibilities, non-linear effects in the poled optical device can be made mode selective for a desired design application. It will be apparent that more than two opposed pairs of electrodes or other pluralities of electrodes (including an odd number of electrodes) can be similarly fabricated to result in other field symmetries upon poling.

Figure 17:
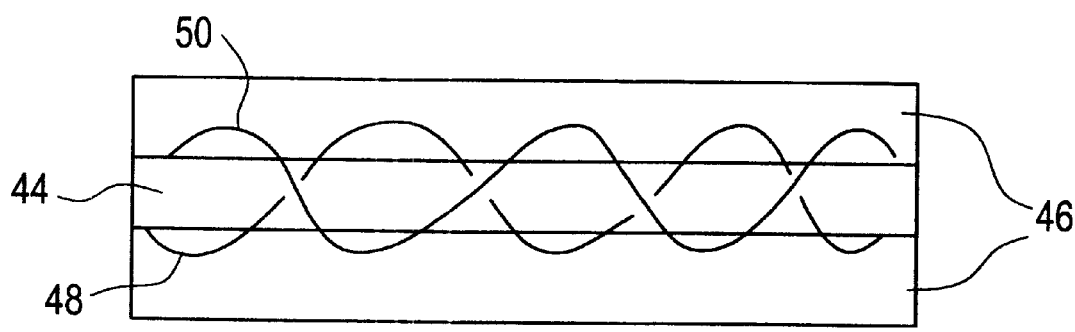
FIG. 17 is a twisted wire embodiment of a polarization insensitive poled optical device, in accordance with the present invention.
Figure 18:
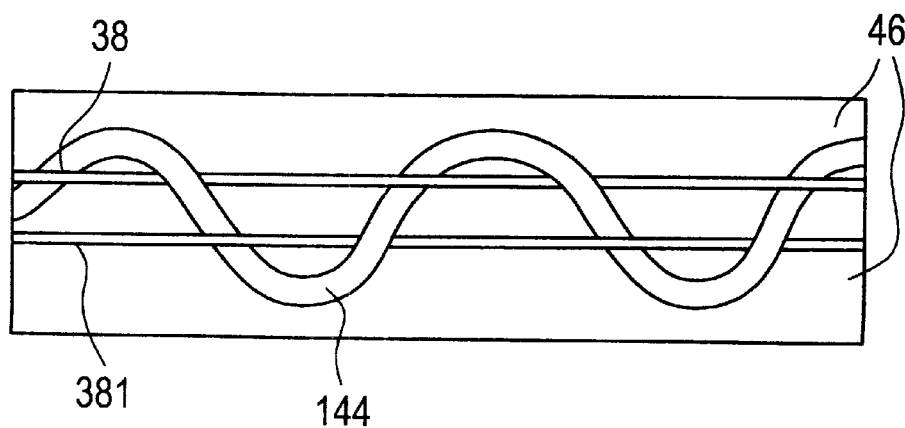
FIG. 18 is a twisted core embodiment of a polarization insensitive poled optical device, in accordance with the present invention.

Referring to FIGS. 17 and 18, other embodiments of polarization insensitive electro-optic devices are taught by the present invention. As in the other embodiments, a cladding 46 secures the plurality of electrodes (which can be at least three electrodes or a specially configured pair of electrodes) to the waveguiding core where the plurality of electrodes couples the waveguiding core in a polarization-insensitive configuration.

In FIG. 17, the plurality of electrodes is a pair of helically wrapped wires 48 and 50 twisting or otherwise surrounding the waveguiding core 44.

Alternatively, in FIG. 18, the waveguiding core is a helically wrapped core 144 alternately wrapping one of the plurality of electrodes 38 and 381. The electrodes 38 and 381 can be solid as in a metal tube or flexible as in a wire.

It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A poled electro-optic device comprising:
   at least one waveguiding core;
   at least three electrodes surrounding the at least one waveguiding core for applying more than one direction of an electric field to the at least one waveguiding core; and
   a cladding securing the at least three electrodes to the at least one waveguiding core.

2. A polarization-insensitive poled electro-optic device comprising:
   a waveguiding core;
   a plurality of electrodes coupled with the waveguiding core for applying more than one direction of an electric field to the waveguiding core to result in a polarization-insensitive configuration; and
   a cladding securing the plurality of electrodes to the waveguiding core.

3. The electro-optic device of claim 2 wherein the plurality of electrodes comprises at least three electrodes for applying a horizontal electric field between a first subset of the at least three electrodes and for applying a non-horizontal electric field between a second subset of the at least three electrodes.

4. The electro-optic device of claim 2 wherein the plurality of electrodes comprises a pair of helically wrapped wires surrounding the waveguiding core.

5. The electro-optic device of claim 2 wherein the waveguiding core comprises a helically wrapped core alternately wrapping one of the plurality of electrodes.

6. A method for producing a poled electro-optic device, the method comprising the steps of:
   providing a hollow tube having at least one waveguiding core;
   positioning a solid, elongated feedstock within the hollow tube;
   positioning at least one pair of electrodes on opposed portions of the at least one waveguiding core within the hollow tube;
   heating at least a portion of the tube, the at least one pair of electrodes and the feedstock to a temperature sufficient to cause the feedstock to deform to the shape of the tube, and
   reducing the outside diameter of the tube, wherein the feedstock comprises a softening point which is less than the softening point of the tube.

* * * * *